United States Patent
Terauchi et al.

(10) Patent No.: US 7,105,260 B2
(45) Date of Patent: Sep. 12, 2006

(54) BINDER RESIN FOR TONER AND TONER

(75) Inventors: Tomoya Terauchi, Sodegaura (JP);
Hirotaka Uosaki, Sodegaura (JP);
Hiroshi Matsuoka, Sodegaura (JP);
Yuji Emura, Sodegaura (JP); Hiroyuki Takei, Sodegaura (JP); Hironobu Hashimoto, Sodegaura (JP)

(73) Assignee: Mitsui Chemicals, Inc., Tokyo (JP)

( * ) Notice: Subject to any disclaimer, the term of this patent is extended or adjusted under 35 U.S.C. 154(b) by 243 days.

(21) Appl. No.: 10/448,121

(22) Filed: May 30, 2003

(65) Prior Publication Data

US 2004/0067430 A1 Apr. 8, 2004

(30) Foreign Application Priority Data

May 31, 2002 (JP) ....................................... 2002-160831
Jun. 4, 2002 (JP) ....................................... 2002-163637

(51) Int. Cl.
*G03G 9/087* (2006.01)
*C08F 20/00* (2006.01)

(52) U.S. Cl. ....................... 430/109; 528/176; 528/195; 528/272; 528/288; 528/289; 528/290; 528/300; 528/302; 528/307; 528/308.6; 525/437; 525/440; 525/444; 430/110; 430/903

(58) Field of Classification Search ................. 528/176, 528/195, 272, 288, 289, 290, 300; 525/437, 525/440, 444; 430/109, 110, 903
See application file for complete search history.

(56) References Cited

FOREIGN PATENT DOCUMENTS

| EP | 0 438 269 A1 | | 7/1991 |
|---|---|---|---|
| EP | 1 011 031 A1 | | 6/2000 |
| EP | 1271256 | * | 1/2003 |
| WO | WO 02/21219 A1 | | 3/2002 |

* cited by examiner

*Primary Examiner*—Samuel A. Acquah
(74) *Attorney, Agent, or Firm*—Burns, Doane, Bwecker & Mathis, LLP

(57) ABSTRACT

A binder resin for a toner comprises a polyester component having a specific structure which is not soluble in tetrahydrofuran, and a polyester component having a specific branched structure which is soluble in tetrahydrofuran. The binder resin can provide a toner, which is superior in low-temperature fixation and offset resistance and can be used in high speed printing in response to the recent market demands owing to its specific structure.

10 Claims, No Drawings

BINDER RESIN FOR TONER AND TONER

BACKGROUND OF THE INVENTION

1. Field of the Invention

The present invention relates to a binder resin for a toner and a toner and in particular to a binder resin for a toner and a toner comprising a specific polyester resin. Also, the invention relates to a binder resin for a toner and a toner, used for electrophotography.

2. Background of the Related Art

With the progress of office automation, the demand for electrophotography-based copying machines and printers has increased rapidly and performance requirements for such equipment have become higher. There is a generally used method which comprises forming an electrostatic latent image on the photo-sensitive material, then developing the image using a toner, transferring the toner image onto a fixing sheet such paper or the like, and heat-pressing the transferred toner image using heat roll (a hot roll fixing method). In this heat roll fixing method, in order to achieve enhanced economical efficiency in power consumption and increased photography speed, and to prevent papers from being curled, a toner superior in fixing properties is needed, which can be fixed at a lower temperature.

In the conventional technique, there has been proposed a method to improve the molecular weight and molecular weight distribution of a binder resin represented by a styrene-acrylic resin or the like. Concretely, it has been tested to have a binder resin of a low-molecular weight and lower fixing temperature.

However, the melting point has been lowered owing to the lowered molecular weight whereas the cohesive force of a resin was also deteriorated simultaneously. Therefore, there has been a problem that an offset phenomenon occurs in the fixing roll.

In order to prevent such a problem, it has been attempted to use a binder resin with a wide molecular weight distribution by mixing a high molecular weight resin and a low-molecular weight resin, or, further to crosslink the high molecular weight portion of the binder resin or the like. With this method, however, it is difficult to satisfy the fixing properties owing to the increased viscosity of the resin.

Meanwhile, as copiers and printers have come to employ a higher speed, high performance requirements in electrified portion have increased. That is, a higher durability is required and a long-term stability is needed for a toner.

A toner using a polyester resin owing to higher density for a binder resin is often proposed, replacing the conventional styrene-acrylic resin. (e.g. publications of JP61-284771A, JP62-291668A JP07-101318B and JP08-3663B, and specification of U.S. Pat. No. 4,833,057, etc.) Most of the cases, main components are a bisphenol-A type derivative and terephthalic acid. A toner (JP08-5947B) using a polyester resin having large number of terephthalic acid and ethylene glycol or 1,4-butanediol derived units is proposed. However, the resulting toner does not solve the above problems.

In order to improve an offset phenomenon, there is a method to add paraffin wax, low-molecular weight polyolefin or the like as a mold release agent to a toner. In JP49-65232A, JP50-28840A, JP50-81342A or the like is disclosed a technique to use a binder resin containing a styrene-acrylic resin. However, the development properties and blocking resistance of toner particles have been deteriorated in some cases whereas an offset phenomenon has been improved. It is confirmed that the mold release agent has little effect when applied to a polyester resin and the developing agent is rapidly depleted when its amount is increased.

In addition to these problems, there are the problems in using a polyester resin as a binder resin for a toner as follows.

Difficult to grind owing to a high density

Easy to cause changes in performance of polyester by humidity due to its hygroscopicity Easy to produce fine powder as time goes by Insufficient durability It is currently difficult to provide a toner satisfying performance in the low-temperature fixing properties and offset resistance, while in addition, maintaining other performance at a high level as well. In order to provide a toner with high resolution of copying images, it needs to give sufficient electrophotographic features to the toner. Many methods have been attempted heretofore in order to achieve high resolution and high image quality of copying images; however, no perfect methods could be achieved heretofore to fully solve the above problems.

Meanwhile, in recent years, an increase in population has increased the amount of energy used and has depleted resources. In connection therewith, resource saving, energy saving, recycling of resources, etc. have strongly been claimed. As to polyethyleneterephthalate (PET) bottles, individual municipalities have started a recycling activity, and PET bottles have come to be utilized as clothes or containers. In addition, development of newly recycled items is desired. Thus, a toner using a polyester resin has become a strong candidate.

SUMMARY OF THE INVENTION

An object of the present invention is to solve problems caused by the conventional toners and also to provide a binder resin for a toner and a toner superior in low-temperature fixing properties, offset resistance and development durability even when copying for a long period.

In order to solve the above problems, the present invention has been realized as a result of extensive review. That is, the present invention is specified by the matters described in the following (1) to (6).

(1) A binder resin for a toner comprising a polyester resin, wherein the polyester resin comprises 0.1 to 40% by weight of tetrahydrofuran insoluble component (A-1) and 99.9 to 60% by weight of tetrahydrofuran soluble component (A-2), the tetrahydrofuran insoluble component (A-1) has a polyester resin structure unit comprising a terephthalic acid-derived structure unit (I), a polyhydric alcohol-derived structure unit (II) comprising 39.9 to 75 mole % of a dihydric alcohol-derived structure unit (II-1-1) having 2 to 10 carbon atoms and 0.1 to 20 mole % of a trihydric alcohol-derived structure unit (II-1-2) having 3 to 10 carbon atoms and 15 to 60 mole % of a dihydric alcohol-derived structure unit containing bisphenol skeleton (II-2), each mole % being based on 100 mole % of the total moles of all the polyhydric alcohol-derived structure unit in component (A-1), and 0.1 to 30 mole % of di- or higher functional atomic group structure unit (III) of 1 to 20 carbon atoms having one or more kinds of elements selected from C, H, N, O and S, based on 100 mole % of the total moles of all the polyhydric alcohol-derived structure unit in component (A-1); and the tetrahydrofuran soluble component (A-2) has a polyester resin structure unit comprising
   a terephthalic acid-derived structure unit (I),
   a polyhydric alcohol-derived structure unit (IV) comprising
      40 to 85 mole % of a dihydric alcohol-derived structure unit (IV-1) having 2 to 10 carbon atoms and
      15 to 60 mole % of a dihydric alcohol-derived structure unit containing bisphenol skeleton (IV-2),
      each mole % being based on 100 mole % of the total moles of all the polyhydric alcohol-derived structure unit in component (A-2),
   2 to 20 mole % of tri- or higher functional atomic group structure unit (V) of 1 to 20 carbon atoms having one or more kinds of elements selected from C, H and O, based on 100 mole % of the total moles of all the dihydric alcohol-derived structure unit, and
   0 to 10 mole % of di- or higher functional atomic group structure unit (VI) having 1 to 20 carbon atoms based on 100 mole % of the total moles of all the polyhydric alcohol-derived structure unit in component (A-2).

(2) A binder resin for a toner wherein
(II-1-1) and (IV-1) structure units of the polyester resin (A) are an ethylene glycol-derived structure unit,
(II-1-2) and (V) structure units of the polyester resin (A) are a trimethylolpropane-derived structure unit,
(II-2) and (IV-2) structure units of the polyester resin (A) are a dihydric alcohol-derived structure unit containing bisphenol A skeleton, and
(III) and (VI) structure units of the polyester resin (A) are a di- or higher isocyanate-derived structure unit.

(3) A binder resin for a toner comprising
a polyester resin (A) obtained by reacting a polyester resin (a-1) with a polyester resin (a-2) and di- or higher functional isocyanate (iii),
wherein the polyester resin (a-1) comprises
   a terephthalic acid-derived structure unit (I),
   a polyhydric alcohol-derived structure unit (II) comprising
      39.9 to 75 mole % of a dihydric alcohol-derived structure unit (II-1-1) having 2 to 10 carbon atoms,
      0.1 to 20 mole % of a trihydric alcohol-derived structure unit (II-1-2) having 3 to 10 carbon atoms and
      15 to 60 mole % of a dihydric alcohol-derived structure unit containing bisphenol skeleton (II-2),
      each mole % being based on 100 mole % of the total moles of all the polyhydric alcohol-derived structure unit in polyester resin (a-1);
the polyester resin (a-2) comprises
   a terephthalic acid-derived structure unit (I),
   a polyhydric alcohol-derived structure (IV) unit comprising
      40 to 85 mole % of a dihydric alcohol-derived structure unit (IV-1) having 2 to 10 carbon atoms and
      15 to 60 mole % of a dihydric alcohol-derived structure unit containing bisphenol skeleton (IV-2),
      each mole % being based on 100 mole % of the total moles of all the polyhydric alcohol-derived structure unit in polyester resin (a-2), and
      0.1 to 20 mole % of tri- or higher functional atomic group structure unit (V) of 1 to 20 carbon atoms having one or more kinds of elements selected from C, H and O, based on 100 mole % of the total moles of all the polyhydric alcohol-derived structure unit in polyester resin (a-2).

(4) A process for producing a binder resin for a toner comprising the steps of: producing a polyester resin (a-1) by depolymerization and polycondensation of
   a terephthalic acid derivative (i),
   a polyhydric alcohol (ii) comprising
      a dihydric alcohol (ii-1-1) having 2 to 10 carbon atoms,
      a trihydric alcohol (ii-1-2) having 3 to 10 carbon atoms and
      a bisphenol or a derivative thereof (ii-2), and
   a terephthalic acid polyester resin (vii);
producing a polyester resin (a-2) by depolymerization and polycondensation of
   the terephthalic acid derivative (i),
   a polyhydric alcohol (iv) comprising
      a dihydric alcohol (iv-1) having 2 to 10 carbon atoms,
      a bisphenol or a derivative thereof (iv-2) and
      a tri- or higher alcohol (iv-3) having 1 to 20 carbon atoms, and
   the terephthalic acid polyester resin (vii); and
reacting the polyester resin (a-1), the polyester resin (a-2) and a di- or higher functional isocyanate (iii).

(5) A binder resin for a toner wherein the binder resin is obtained by reacting a polyester resin (a-1) with a bi- or higher functional isocyanate (iii) and, if necessary, a polyester resin (a-2), in the presence of a low-molecular weight wax (vii).

(6) A toner comprising a binder resin for a toner.

Other and further objects, features and advantages of the invention will appear more fully from the following description.

DETAILED DESCRIPTION OF THE PREFERRED EMBODIMENTS

This invention is described in more detail below.

A binder resin for a toner used in the present invention comprises a polyester resin (A). The polyester resin (A) comprises 0.1 to 40% by weight of a tetrahydrofuran (THF) insoluble component (A-1) and 99.9 to 60% by weight of a tetrahydrofuran soluble component (A-2). Preferably, the tetrahydrofuran insoluble component (A-1) is 0.5 to 25% by weight and the tetrahydrofuran soluble component (A-2) is 99.5 to 75% by weight. When the tetrahydrofuran insoluble component (A-1) is less than 0.1% by weight, an offset resistance is not sufficient in some cases. When the tetrahydrofuran insoluble component is more than 40% by weight, the fixing properties are deteriorated in some cases.

The tetrahydrofuran insoluble component (A-1) of the polyester resin (A) according to this invention, is first described in detail. The tetrahydrofuran insoluble component (A-1) of the polyester resin (A) according to the invention comprises a terephthalic acid-derived structure unit (I), a particular polyhydric alcohol-derived structure unit (II) and an atomic group structure unit (III) selected from C, H, N, O and S. The tetrahydrofuran insoluble component (A-1) seems to be insoluble even in such a good solvent as a tetrahydrofuran because of its crosslinked structure.

The polyhydric alcohol-derived structure unit (II) comprises
39.9 to 75 mole % of a dihydric alcohol-derived structure unit (II-1-1) having 2 to 10 carbon atoms,
0.1 to 20 mole % of a trihydric alcohol-derived structure unit (II-1-2) having 3 to 10 carbon atoms and 15 to 60 mole % of a dihydric alcohol-derived structure unit containing bisphenol skeleton (II-2), each mole % being based on the total moles of all the polyhydric alcohol-derived structure units in component (A-1).

As the dihydric alcohol-derived structure unit (II-1-1) having 2 to 10 carbon atoms, there can be mentioned, for example, dihydric alcohol-derived structure units such as ethylene glycol, 1,2-butanediol, 1,2-propylene glycol, 1,3-propanediol, 1,3-butanediol, 1,4-butanediol, 2,3-butanediol, diethylene glycol, triethylene glycol, dipropylene glycol, 1,5-pentanediol, 1,6-hexanediol, neopentylglycol, 2-ethyl-1, 3-hexanediol, etc. Ethylene glycol, diethylene glycol and triethylene glycol-derived structure units are preferred. Ethylene glycol-derived structure unit is preferred particularly. Because diethylene glycol and triethylene glycol-derived structure units can lower the glass transition temperature (Tg) as compared to the ethylene glycol-derived structure unit, they are used preferably in order to control Tg. As the trihydric alcohol-derived structure unit (II-1-2) having 3 to 10 carbon atoms, there can be mentioned, for example, trihydric alcohol-derived structure units such as trimethylolpropane, glycerin, 2-methylpropanetriol, trimethylolethane or the like. The trimethylolpropane-derived structure unit is particularly preferred.

The proportion of the dihydric alcohol-derived structure unit (II-1-1) having 2 to 10 carbon atoms is preferably 45 to 75 mole % and more preferably 45 to 71 mole %. When the proportion is less than 39.9 mole %, a lower density and inferior mechanical durability result in some cases. On the other hand, when the proportion is more than 75 mole %, a higher density, inferior grindability and lower productivity result in some cases.

The proportion of the trihydric alcohol-derived structure unit (II-1-2) having 3 to 10 carbon atoms is preferably 2 to 18 mole % and more preferably 3 to 14 mole %. When the proportion is less than 0.1 mole %, it is difficult to crosslink as described below, and accordingly the high molecular weight component decreases. Therefore, an offset resistance or mechanical durability could be deteriorated in some cases. In the meantime, when the proportion is more than 20 mole %, excessive crosslinkage occurs so that the molecular weight becomes excessively higher, and accordingly grindability is deteriorated. Or a rapid gelation takes place when a high molecular polymer is produced by polyester polycondensation as described later, making it difficult to control an intended reaction in some cases.

As the dihydric alcohol-derived structure unit containing bisphenol skeleton (II-2), there are mentioned, for example, bisphenol A type derivative-derived structure units such as a bisphenol A-polyethylene oxide adduct used for desirable examples besides a bisphenol A-2 propylene oxide adduct or bisphenol A-3 propylene oxide adduct. In an alkylene oxide adduct, it is necessary that the carbon atoms in the alkylene are 2 to 10 and that the number of addition is 2 to 20.

The proportion of the dihydric alcohol-derived structure unit containing bisphenol skeleton (II-2) is preferably 15 to 45 mole % and more preferably 15 to 30 mole %. When the proportion is less than 15 mole %, a density gets excessively high, and accordingly grindability is deteriorated so that productivity is lowered in some cases. And inferior mechanical durability results in some cases. When the proportion is more than 60 mole %, a density is excessively lowered and the mechanical durability is worsened in some cases.

An atomic group structure unit (III) having one or more kinds of elements selected from C, H, N, O and S is contained in an amount of 0.1 to 30 mol % based on the total moles of all the polyhydric alcohol-derived structure units in component (A-1). The atomic group structure unit (III) subjects mainly a resin comprising a terephthalic acid-derived structure unit (I) and a polyhydric alcohol-derived structure unit (II) to crosslinkage and high molecular weight. As the atomic group structure unit (III), there are mentioned in concrete terms, for example, diisocyanate-derived structure unit such as hexamethylene diisocyanate, isophorone diisocyanate, diphenylmethane diisocyanate, xylylene diisocyanate, tetramethylene diisocyanate, etc. or an isocyanate-derived structure unit such as a tri- or higher polyisocyanate, etc. besides tolylene diisocyanate. A tolylene diisocyanate-derived structure unit is particularly preferred. The isocyanate-derived structure unit is used preferably owing to its high inter-molecular binding force and accordingly excellent mechanical durability results.

The proportion of the atomic group structure unit (III) is preferably 1 to 15 mole % and more preferably 1 to 10 mole %. When the proportion is less than 0.1 mole %, a crosslinking portion is small, which means that a high-molecular weight material component becomes small. Therefore, there are some cases where an offset resistance and the mechanical durability become deteriorated. When the proportion is more than 30 mole %, inferior grindability results or it is difficult to control an intended reaction upon crosslinking reaction to be described later.

The tetrahydrofuran insoluble component (A-1) structure can be analyzed and determined by analyzing carboxylic acids, alcohol, etc. resulted from thorough decomposition of the resin by means of hydrolysis reaction, using chromatography, IR, NMR or the like.

The tetrahydrofuran soluble component (A-2) is elaborated as follows. The tetrahydrofuran soluble component (A-2) comprises a terephthalic acid-derived structure unit (I), polyhydric alcohol-derived structure units (IV) and (V), and a di- or higher functional atomic group structure unit (VI) having 1 to 20 carbon atoms.

The polyhydric alcohol-derived structure unit (IV) comprises 40 to 85 mole % of the dihydric alcohol-derived structure unit (IV-1) having 2 to 10 carbon atoms and 15 to 60 mole % of dihydric alcohol-derived structure unit containing bisphenol skeleton (IV-2), each mole % being based on the total moles of all the polyhydric alcohol-derived structure units in component (A-2).

As the dihydric alcohol-derived structure unit (IV-1) having 2 to 10 carbon atoms, there can be mentioned, for example, the same as the dihydric alcohol-derived structure unit (II-1-1). The ethylene glycol-derived structure unit is particularly preferred. As the dihydric alcohol-derived structure unit containing bisphenol skeleton (IV-2), there are specially mentioned, for example, a bisphenol A type derivative-derived structure unit which is identical to the dihydric alcohol-derived structure unit containing bisphenol skeleton (II-2) as described above.

The proportion of the dihydric alcohol-derived structure unit (IV-1) having 2 to 10 carbon atoms is preferably 45 to 80 mole % and more preferably 50 to 75 mole %. When the proportion is less than 40 mole %, density becomes lower so that the inferior mechanical durability results in some cases. When the proportion is more than 85 mole %, density becomes higher so that deteriorated grindability and inferior productivity result in some cases.

The proportion of the dihydric alcohol-derived structure unit containing bisphenol skeleton (IV-2) is preferably 15 to 45 mole % and more preferably 15 to 35 mole %. When the proportion is less than 15 mole %, density becomes higher so that inferior grindability or a lower productivity result. When the proportion is more than 60 mole %, density becomes lower so that inferior mechanical durability results.

The tri- or higher functional atomic group structure unit (V) having one or more kinds of elements selected from C, H and O comprises 2 to 20 mole % based on the total moles of all the polyhydric alcohol-derived structure units in component (A-2). As the tri- or higher functional atomic group structure unit (V) is introduced, the tetrahydrofuran soluble component (A-2) has a branched structure so that orientation or crystallization is suppressed. As the tri- or higher atomic group structure unit (V), there are mentioned, for example, the same structure units as the trihydric alcohol-derived structure unit (II-1-2) as specifically described above, more preferably a trimethylolpropane-derived structure unit. Also, there is mentioned a polycarboxylic acid-derived structure unit such as a unit derived from trimellitic acid or pyromellitic or the like.

The proportion of the tri- or higher functional atomic group structure unit (V) is preferably 2 to 15 mole %, and more preferably 2.5 to 10 mole %. When the proportion is less than 2 mole %, orientation and crystallization of molecular chains appear while melting so that inferior fixing properties result in some cases. When the proportion is more than 20 mole %, a rapid gelation takes place when a high molecular polymer is produced by polyester polycondensation or the like to be described later, making it difficult to control an intended reaction in some cases therefore, such a proportion is not preferred.

The proportion of the bi- or higher functional atomic group structure unit (VI) having 1 to 20 carbon atoms is 0 to 10 mole %, based on 100 mole % of the total moles of all the polyhydric alcohol-derived structure units in component (A-2). The atomic group structure unit (VI) mainly crosslinks low-molecular weight polyester resins to have the effects of a reduced low-molecular weight component which results in inferior offset resistance. As the atomic group structure unit (VI), there are mentioned in concrete terms, for example, compound-derived structure units such as tolylene diisocyanate, hexamethylene diisocyanate, isophorone diisocyanate, diphenylmethane diisocyanate, xylylene diisocyanate, tetramethylene diisocyanate and the like. Particularly preferred is the tolylene diisocyanate-derived structure unit.

The proportion of the atomic group structure unit (VI) is preferably 0.1 to 10 mole %, and more preferably 1 to 10 mole %. When the proportion exceeds 10 mole %, the high molecular weight component gets excessively increased so that the fixing properties are inferior in some cases.

In the present invention, the tetrahydrofuran soluble component (A-2) has 6 to 100 for its Mw/Mn values preferably when measured by GPC, and more preferably 6 to 60. When Mw/Mn is small, insufficient offset resistance results; when it is great, the fixing properties are deteriorated in some cases.

The tetrahydrofuran soluble component (A-2) structure can be analyzed and obtained by analyzing the tetrahydrofuran solution portion (A-2) itself, using IR, NMR or the like in the same method as the tetrahydrofuran insoluble component (A-1).

A binder resin for a toner used in the present invention has a peak molecular weight of 3,000 to 18,000 when measured by GPC. When the peak molecular weight is less than 3,000, deteriorated offset resistance and inferior mechanical durability result; when the peak molecular weight is more than 18,000, the fixing properties are deteriorated.

When the compound-derived structure unit by the present invention is comprised in the polyester resin (A), then its production process is not particularly restricted. That is, there is no need to use raw materials of the corresponding compounds and compounds other than the corresponding compounds can be used to produce the polyester resin (A); the resulting polyester resin once obtained can be used without any problem.

The present invention is not particularly restricted to a process for producing the polyester resin (A), but preferably a method to obtain the polyester resin (A) can be mentioned by reacting the polyester resin (a-1) comprising
a terephthalic acid-derived structure unit (I) and
a polyhydric alcohol-derived structure unit (II) comprising
   39.9 to 75 mole % of a dihydric alcohol-derived structure unit (II-1-1) having 2 to 10 carbon atoms,
0.1 to 20 mole % of a trihydric alcohol-derived structure unit (II-1-2) having 3 to 10 carbon atoms and
15 to 60 mole % of a dihydric alcohol-derived structure unit containing bisphenol skeleton (II-2), each mole % being based on 100 mole % of the total moles of all the polyhydric alcohol-derived structure unit in polyester (a-1), the polyester resin (a-2) comprising
a terephthalic acid-derived structure unit (I) and
a polyhydric alcohol-derived structure unit (IV) comprising
40 to 85 mole % of a dihydric alcohol-derived structure unit (IV-1) having 2 to 10 carbon atoms,
15 to 60 mole % of a dihydric alcohol-derived structure unit containing bisphenol skeleton (IV-2) having 3 to 10 carbon atoms,
   each mole % being based on 100 mole % of the total moles of all the polyhydric alcohol-derived structure unit in polyester resin (a-2) and 0.1 to 20 mole % of tri- or higher atomic group structure unit (V) of 1 to 20 carbon atoms having one or more kinds of elements selected from C, H and O, based on 100 mole % of the total moles of all the polyhydric alcohol-derived structure unit in polyester resin (a-2), and a di- or higher functional isocyanate (iii).

The polyester resin (A) can be produced using the corresponding carboxylic acid, alcohol and isocyanate. Also, the corresponding terephthalic acid polyester resin can further be used. As preferable examples, processes are used for producing the terephthalic acid polyester resin (A) comprising the steps of:
   producing the polyester resin (a-1) by depolymerization and polycondensation of
a terephthalic acid derivative (i),
a polyhydric alcohol (ii) comprising
a dihydric alcohol having 2 to 10 carbon atoms (ii-1-1),
a trihydric alcohol (ii-1-2) having 3 to 10 carbon atoms and
a bisphenol or a derivative thereof, and
a terephthalic acid polyester (vii);
   producing the polyester resin (a-2) by depolymerization and polycondensation of
the terephthalic acid derivative (i),
a polyhydric alcohol (iv) comprising
a dihydric alcohol (iv-1) having 2 to 10 carbon atoms,
a bisphenol or a derivative thereof (ii-2),
a tri- or higher functional alcohol (iv-3) having 1 to 20 carbon atoms, and
the terephthalic acid polyester (vii); and
   reacting the polyester resin (a-1),
the polyester resin (a-2) and
di- or higher isocyanate (iii).

In the present invention, as a terephthalic acid derivative (i) used in production of a polyester resin (a-1) and a polyester resin (a-2), there are mentioned, for example, a terephthalic acid, a terephthalic anhydride, alkyl esters of the terephthalic acid or the like. The terephthalic acid is preferred.

In the present invention, other acid compounds can be used together. Specifically, there can be mentioned, for example, aliphatic dicarboxylic acids such as malonic acid, succinic acid, glutaric acid, adipic acid, azelaic acid, sebacic acid, and the like; unsaturated dicarboxylic acids such as maleic acid, fumaric acid, citraconic acid, itaconic acid and the like; aromatic dicarboxylic acids such as phthalic acid, terephthalic acid, isophthalic acid, phthalic anhydride and the like; and anhydrides or lower alkyl esters of these dicarboxylic acids. It is also possible to use a monocarboxylic acid and a polycarboxylic acid for the purpose of molecular weight control. As preferred monocarboxylic acids, there are mentioned aliphatic carboxylic acids such as octanoic acid, decanoic acid, dodecanoic acid, myristic acid, palmitic acid, stearic acid and the like, and they may have branches or unsaturated groups. These aliphatic monocarboxylic acids may be used for the purpose of control of glass transition temperature because of having an action of giving a reduced glass transition temperature. Aromatic carboxylic acids such as benzoic acid, naphthalenecarboxylic acid or the like may be used too. As the tri- or higher carboxylic acid, there are mentioned, for example, trimellitic acid, pyromellitic acid and anhydrides thereof.

As specific examples of the dihydric alcohol (ii-1-1) having 2 to 10 carbon atoms and dihydric alcohol (iv-1) having 2 to 10 carbon atoms, there can be mentioned the dihydric alcohol described before. Preferably, there can be mentioned, for example, ethylene glycol or 1,4-butanediol used in production of polyethylene terephthalate (PET) or polybutylene terephthalate (PBT) as described below. Ethylene glycol is particularly preferred.

As a preferable example of the bisphenol or the derivative thereof (ii-2) and bisphenol or the derivative thereof (iv-2), there can be mentioned, for example, the bisphenol A type derivative mentioned before.

As a preferable example of trihydric alcohol (iii-1-2) having 3 to 10 carbon atoms, a tri- or higher functional alcohol (iv-3) having 1 to 20 carbon atoms, there can be mentioned the trihydric alcohol described before. Trimethylolpropane is particularly preferred.

Other alcohols can be used together besides alkylene diol, triol, etherified bisphenol. Specifically, there can be used all of the polyhydric alcohols conventionally used in production of polyester resins, for example, alicyclic diols such as cyclohexanedimethanol, hydrogenated bisphenol A and the like; derivatives of bisphenol F or bisphenol S, such as, alkylene oxide of bisphenol F or bisphenol S of ethylene oxide, propylene oxide or the like; aromatic diols of dicarboxylic acid lower alkyl esters such as bishydroxyethylterephthalic acid, bishydroxypropylterephthalic acid, bishydroxybutylterephthalic acid or the like; and tetrahydric or higher alcohols such as pentaerythritol, sorbitol, sorbitan and the like. Monohydric alcohols can also be used for molecular weight control. As preferred monohydric alcohols, there can be mentioned aliphatic monohydric alcohols such as octanol, decanol, dodecanol, myristyl alcohol, palmityl alcohol, stearyl alcohol and the like. They may have branches and unsaturated groups.

As specific examples of terephthalic acid polyester (vii), there can be mentioned PET and PBT described before. The molecular weight distribution, composition and production process of these PET and PBT and its shape when it is used are not restricted. These polyesters are obtained by processing recycled products into a flake form such as PET bottle or the like and have a weight-average molecular weight of about 30,000 to 90,000.

To produce the polyester resin (a-1) and the polyester resin (a-2) using the terephthalic acid polyester (vii), it is preferable to produce the terephthalic acid polyester (vii), the carboxylic acid, alcohol by depolymerization and polycondensation or by polycondensation at 200 to 270° C., more preferably at 220 to 260° C. The depolymerization and polycondensation may be carried out at a time. When a reaction temperature is low, the solubility of aromatic polyester such as PET or PBT, or acid component such as terephthalic acid or the like during depolymerization is lowered, and accordingly the reaction time becomes longer; therefore, a high reaction temperature is not preferred because it incurs decomposition of the raw materials.

The depolymerization reaction and polycondensation reaction can be conducted by a known process such as solvent-free high-temperature polycondensation, solution polycondensation or the like in an inert gas such as nitrogen gas or the like. In the reaction, the proportions of the acid monomer and alcohol monomer used are generally 0.7 to 1.4, in terms of the molar ratio of the hydroxyl group of the latter to the carboxyl group of the former.

In the polycondensation reaction for obtaining the above polyester resin, the reaction is preferably processed rapidly by adding a catalyst thereto. As the above catalysts, there can be mentioned a tin oxide, specifically dibutyl tin oxide; however, catalysts are not restricted to them. The amount of the catalyst used is preferably 0.01 to 1.00% by weight.

The polyester resin (a-1) of the present invention is a material to form the tetrahydrofuran insoluble component (A-1) by reacting and crosslinking with isocyanate (iii) to be described later. The hydroxyl value of the polyester resin (a-1) is preferably 10 to 100 mgKOH/g and more preferably 25 to 90 mgKOH/g. Meanwhile, the polyester resin (a-2) is hardly reacted with isocyanate (iii), which is a material to be a main component of the tetrahydrofuran soluble component. The hydroxyl value of the polyester resin (a-2) is preferably less than 20 mg-KOH/g and more preferably less than 10 mgKOH/g.

In the present invention, the polyester resin (A) can be produced either by reacting the polyester resin (a-1), the polyester resin (a-2) and polyisocyanate, what is called urethanization reaction, or by reacting the polyester resin (a-1) and isocyanate (iii) to reaction, and then to mixing it with the polyester resin (a-2).

As specific examples of isocyanate (iii), there can be mentioned, for example, tolylene diisocyanate and other diisocyanates such as hexamethylene diisocyanate, isophorone diisocyanate, diphenylmethane diisocyanate, xylene diisocyanate, tetramethylene diisocyanate and the like.

A known method can be adopted for the reaction of the isocyanate and polyester resin. Specifically, it may be conducted with a stirrer-fed reactor or with twin screw kneading extruder. It is preferably a method giving rise to a reaction in an extruder and more preferably in a twin screw kneading extruder.

The temperature of the reaction is preferably 150 to 200° C. The amount of the polyester resin (a-1) and the polyester resin (a-2) is 1 to 70 parts by weight for the polyester resin (a-1) and preferably 5 to 50 parts by weight, while it is 30 to 99 parts by weight for the polyester resin (a-2) and preferably 50 to 95 parts by weight. The amount of isocyanate (iii) is varied depending on the isocyanate type or the hydroxyl value of polyester resin (a-1), which cannot be specified collectively; however, 0.1 to 1.0 parts by weight is preferred. More specifically, isocyanate is preferably 0.2 to 2 mole and more preferably 0.5 to 1.5 mole for 1 mole equivalent of the hydroxyl group value of polyester resin (a-1). When the mole equivalent is less than 0.2, offset resistance is insufficient. When the mole equivalent is more than 2 mole equivalent, it is insufficient from the viewpoint of safety in that there is a possibility that polyisocyanate in the resin produced exists in a monomer as it is.

The polyester resin (A) can be used as the binder resin for a toner as it is, but it can further comprise a wax. There can be mentioned polyolefin wax such as polyethylene wax, polypropylene wax or the like. The amount thereof is preferably within the scope of 0 to 10 parts by weight in the binder resin for a toner.

Specific commercial products of the polyolefin wax include, but not limited to, Hi-wax 800P, 400P, 200P, 100P, 720P, 420P, 320P, 405 MP, 320 MP, 4051E, 2203A, 1140H, NL800, NP055, NP105, NP505, NP805 and the like produced by Mitsui Chemicals, Inc.

Examples of waxes which may be contained in the binder resin for a toner include natural waxes such as ceramic wax, rice wax, sugar wax, urushi wax, bees wax, carnauba wax, candelila wax, montan wax or the like. The amount thereof is preferably 0 to 10% by weight in the binder resin for a toner.

In the present invention, to obtain the binder resin for a toner comprising a wax, it is preferred that the polyester resin (a-1) and isocyanate (iii), and, if necessary, the polyester resin (a-2) are reacted in the presence of a wax to use the resulting resin as the binder resin for a toner. It is more preferred that the polyester resin (a-1), isocyanate (iii) and the polyester resin (a-2) are reacted in the presence of a wax to use the resulting resin as the binder resin for a toner. When the polyester resin (a-1) and isocyanate (iii) are reacted in the presence of a wax to obtain urethane modified polyester, the binder resin for a toner can further be mixed with the polyester resin (a-2). The isocyanate (iii) is reacted with the polyester in the presence of a wax so that the toner to be described later has superior grindability and toner particles with a uniform weight-average particle diameter can be obtained. A desirable weight-average particle diameter is less than 10 micro-meters and preferably 3 to 10 micro-meters and more preferably 5 to 10 micro-meters. A weight-average particle diameter of the toner can be measured, for example, with a coulter counter. When the weight-average particle diameter is more than 10 micro-meters, it is difficult to achieve fine images.

As desirable components which may be comprised in the binder resin for a toner of the present invention other than waxes, there can be mentioned, for example, the conventional binder resin for a toner such as styrene copolymers, polyol resin, polyamide resin, silicone resin or the like.

A density of the binder resin for a toner used in the present invention is preferably 1.20 to 1.27 g/cm$^3$. When the density is less than 1.20 g/cm$^3$, the mechanical durability is worsened, while when the density is more than 1.27 g/cm$^3$, the grindability is worsened; therefore the productivity is lowered.

The polyester resin (A) used in the binder resin for the toner of the present invention has a glass transition temperature (Tg) of 40 to 70° C. preferably. When Tg is extremely low, the resulting toner causes agglomeration of toner particles, which is called blocking, while when Tg is extremely high, the fixing properties are worsened in some cases.

The toner of the present invention is described in more detail below.

The toner of the present invention comprises at least the binder resin for a toner of the present invention described before, charge control agent (CCA), colorants and surface-treating agent. The amount of binder resin for a toner of the present invention is preferably 50 to 90% by weight in the toner.

The toner used in the present invention has such as a viscoelasticity that, in the curve obtained by using the axis of abscissas as temperature and the axis of ordinates as a logarithm G' (storage modulus), it is needed that the maximum value and/or shoulder should not appear in the range 100~180° C. When the maximum value and/or shoulder appear in the curve, the fixing properties are worsened in some cases.

Components other than the binder resin for a toner in the toner of the present invention are described in detail below. Known dyes and pigments can be used for colorants. Specifically, the colorants include, for example, carbon black, magnetite, Phthalocyanine Blue, Peacock blue, Permanent red, lake red, Rhodamine lake, Hansa Yellow, Permanent yellow, benzidine yellow, nigrosine dyes (C. I. No. 50415), aniline blue (C. I. No. 50405), charcoal blue (C. I. No. azoec Blue 3), chrome yellow (C. I. No. 14090), ultra marine blue (C. I. No. 77103), Dupont oil red (C. I. No. 26105), Orient oil red #330 (C. I. No. 60505), Quinoline Yellow (C. I. No. 47005), metylene blue chloride (C. I. No. 52015), Malachite Green oxalate (C. I. No. 42000), lamp black (C. I. No. 77266), rose Bengal (C. I. No. 45435), oil black, azo oil black or the like. The other amount to be used is preferably 3 to 15 mass parts to 100 mass parts of the binder resin for a toner.

Any of known charge control agents of nigrosine, quaternary ammonium salt or metal containing azo dyes can be properly selected and used. The amount to be used is usually 0.1 to 10 mass parts to 100 mass parts of a binder resin for a toner.

A surface-treating agent added in the toner is present between the toner and a carrier or in the toner, whereby the powder fluidity and life of developing agent can be improved. As specific examples of the surface-treating agent, there can be mentioned, for example, fine powders of colloidal silica, alumina, titanium oxide, polytetrafluoroethylene, polyvinylidene chloride, polymethyl methacrylate, polystyrene ultrafine particles and silicone. As commercial products, there are mentioned, for example, AEROSIL 130, 200, 200V, 200CF, 200FAD, 300, 300CF, 380, R972, R972V, R972CF, R974, R976, RX200, R200, R202, R805, R812, R812S, TT600, MOX80, MOX170, COK84, titanium oxide T805 and titanium oxide P25 (these are products of Nippon Aerosil Co., Ltd. and Degussa Japan Co., Ltd.); and CAB-O-SIL L90, LM130, LM150, M5, PTG, MS55, H5, HS5, LM150D, M7D, MS75D, TS720, TS610 and TS530 (these are products of CABOT Corp.). The specific surface area of the surface-treating agent is preferably 30 m$^2$/g or more, particularly 50 to 400 m$^2$/g as measured by nitrogen adsorption using the BET method. The amount of the surface-treating agent used is preferably 0.1 to 20 parts by weight per 100 parts by weight of the binder resin for a toner.

The toner in the present invention may contain a polyolefin wax and the amount of the polyolefin wax used is 0 to 10 parts by weight per 100 parts by weight of the binder resin for a toner.

In order to produce the toner of the present invention containing these materials, the binder resin for a toner of the present invention, colorant and, as necessary, other additives are sufficiently mixed using a powder mixer. The resulting mixture is then melt-kneaded using a heat roll, a kneader or a twin screw extruder to sufficiently mix the individual components. The melt-kneaded material is cooled, ground, and sieved to collect particles having particle diameters of ordinarily 5 to 20 micro-meters. The collected particles are coated with a surface-treating agent using a powder mixing method, to obtain a toner.

The resulting toner according to the present invention can employ various development methods, for example, a cascade development method, a magnetic flash development method, a powder cloud development method, a touch-down development method, a so-called micro-toning development method using, as a carrier, a magnetic toner produced by grinding, and a so-called bipolar magnetic toner development method in which a required amount of toner charges are obtained by the friction between magnetic toner particles. The development methods are not restricted thereto.

To the toner obtained by the present invention can be applied various fixing methods besides an oil-free fixing method, for example, an oil-coated heat roll fixing method, a flash fixing method, an oven fixing method, and a pressure fixing method. To the toner obtained by the present invention can be applied to various cleaning methods, for example, a so-called fur brush method, a blade method or the like.

EXAMPLES

The present invention is described specifically below by way of Examples. However, the present invention is not restricted to these Examples. Also, "parts" hereinafter indicates parts by weight otherwise mentioned in advance.

The molecular weight and molecular weight distribution of the binder resin for a toner are measured by GPC. The measurement is conducted in terms of the following conditions, based on the monodispersed standard polystyrene.

| | |
|---|---|
| Detector: | SHODEX RI-71S |
| Solvent: | Tetrahydrofuran |
| Column: | KF-G + KF-807L × 3 + KF800D |
| Flow rate: | 1.0 ml/min |
| Sample: | 0.25% THF solution |

The reliability of the measurement under the above conditions can be confirmed if Mw/Mn of NBS706 polystyrene sample (Mw=288,000, Mn=137,000, Mw/Mn=2.11) is 2.11±0.10.

The glass transition temperature (Tg) of the present invention was measured using DSC-20 (a product of Seiko Instruments Inc.) according to differential scanning calorimetry (DSC). About 10 mg of a sample was subjected to temperature elevation from −20 to 100° C. at a rate of 10° C./min to obtain a curve; in the curve, an intersection between the base line and the inclined line of the endothermic peak was determined; the Tg of the sample was determined from the intersection. It is desired that, before the above temperature elevation measurement, the sample resin is heated to about 200° C., is kept at that temperature for 5 minutes, and is cooled quickly to normal temperature (25° C.), in order to allow the sample to unify a thermal history.

The ratio of THF insoluble component and THF soluble component of the present invention was obtained by the following measurement method.

A mixture of the resin and THF, containing about 5 weight % of the resin, was prepared by mixing about 2.5 g of the resin and 47.5 g of THF. (Hereinafter, the proportion of the resin in the mixture is referred to as "RC".) Then the mixture was stirred for 12 hours at 25±3° C. so that the soluble portion of the resin was completely dissolved. Then the mixture was left at rest for 16 hours. After confirming that the insoluble portion and the supernatant liquid are separated the supernatant liquid was analyzed. (Hereinafter, the concentration of the resin in the supernatant liquid is referred to as "SC".) In order to obtain SC value, 5 g of the supernatant liquid was taken from the mixture and dried at 150° C. for one hour. SC was calculated from the measured weight of the residual resin after the drying.

The percentage of the THF insoluble component and the THF soluble component are calculated from RC and SC according to the following equations.

Percentage of $THF$ soluble component=$SC/RC \times 100$ (weight %)

Percentage of $THF$ insoluble component=$(RC-SC)/RC \times 100$ (weight %)

Next, the supernatant liquid was removed from the mixture by decantation. The residue was washed with THF several times and was dried under a reduced pressure at 40° C. Thus the THF insoluble portion was obtained and then analyzed.

The acid value of the present invention refers to mg of potassium hydroxide necessary to neutralize 1 g of the resin. The OH value refers to mg of potassium hydroxide necessary to neutralize the acid anhydride necessary to esterify the OH group present in 1 g of the resin.

The viscoelasticity of a toner was measured using Stress Tech Rotary Rheometer (a product of ReoLogica Instruments AB). The measurement was made by subjecting parallel plates to temperature elevation from 50 to 200° C. at a rate of 2° C./min under the conditions of gap=1 mm, angular frequency=1 Hz and stress strain=1%. Using the measurement result, a curve was prepared by using the axis of abscissas as temperature and the axis of ordinates as logarithm of G' (storage modulus). It is confirmed whether a maximum value and/or shoulder in the curve prepared above is appeared at 100 to 180° C.

The fixing properties of a toner were evaluated as follows.

1. Fixing Properties

An unfixed image was formed using a copier produced by remodeling a commercial electrophotograph copier. This unfixed image was fixed using a hot roller fixing apparatus produced by remodeling of the fixing section of a commercial copier. The fixing was conducted at a fixing speed of the hot roll, of 300 mm/sec with the temperature of the heat roller being changed at intervals of 5° C. The fixed image obtained was rubbed 10 times by applying a load of 0.5 kg using a sand eraser (a product of Tombow Pencil Co., Ltd.), and the image densities before and after the rubbing test were measured using a Macbeth reflection densitometer. The lowest fixing temperature when the change of image density became 70% or more, was taken as the lowest fixing temperature of the toner.

Incidentally, the hot roller fixing apparatus used had no silicone oil feeder. The environmental conditions were normal temperature and normal humidity (temperature=22° C., relative humidity=55%).

○: lowest fixing temperature≦170° C.
Δ: 190° C.≧lowest fixing temperature>170° C.
x: lowest fixing temperature>190° C.

2. Offset Resistance

The offset resistance was evaluated as follows. According to the above measurement of the lowest fixing temperature, an unfixed image was formed using the above copier; the toner image was transferred and fixed using the above hot roller fixing apparatus; then, a white transfer paper was fed into the hot roller fixing apparatus under the same conditions; and the appearance of toner staining the transfer paper was visually examined. This operation was repeated by gradually increasing the set temperature of the hot roller of the hot roller fixing apparatus. The lowest set temperature at which toner staining appeared on the transfer paper was taken as the temperature of offset appearance. The environmental conditions were normal temperature and normal humidity (temperature=22° C., relative humidity=55%).

○: temperature of offset appearance≧240° C.
△: 240° C.>temperature of offset appearance≧220° C.
×: 220° C.>temperature of offset appearance 3. Development Durability The development durability of a toner was evaluated by filling a toner in a commercial copier (a product of Toshiba Corporation, named Presio 5560), then conducting continuous copying of 100,000 copies, and evaluating the number of sheets fed from the start to the time when the deterioration of image density and image quality began.

○: No deterioration at 70,000th or more sheets
△: Deterioration began at not less than 50,000th and less than 70,000th sheets
×: Deterioration began at less than 50,000th sheets Production of Polyester Resin The production of a resin α-1 to a resin α-8 corresponding to the polyester resin (a-1) and a resin β-1 to β-11 corresponding to the polyester resin (a-2) is conducted. The production of a resin α-1 is described in concrete terms. As for the resin α-2 to α-8 and the resin β-1 to β-11, the resin units and monomer compositions are changed to the conditions in Table 1 and Table 2 and others are the same as the method of the polyester resin α-1. Also, resin analytical results are shown in Table 1 and Table 2 along with those of α-1.

A 5-liter, 4-necked flask was provided with a reflux condenser, a water-separating unit, a nitrogen gas inlet tube, a thermometer and a stirrer. Thereinto were fed 50 mole % of a recycled PET flake (weight-average molecular weight: 75,000) on the ethylene glycol unit in the PET, 22 mole % of Actcall KB300 (a product of bisphenol A derivative by Mitsui Takeda Chemicals, Inc.), 20.0 mole % of triethylene glycol, 8 mole % of trimethylolpropane and 36 mole % of terephthalic acid. Further, dibutyl tin oxide was fed in an amount of 0.5 part by weight. Depolymerization and dehydration and polycondensation were conducted at 240° C. with nitrogen being introduced into the flask. When the acid value of the reaction mixture reached a predetermined level, the reaction mixture was taken out of the flask, cooled, and ground to obtain a resin α-1.

Examples 1 to 7 and Comparative Examples 1 to 5

The embodiments of the present invention are described specifically for a representative case, i.e. Example 1. Also for resins 2 to 12, i.e. Examples 2 to 7 and Comparative Examples 1 to 5, resins and toners were obtained and evaluated in the same manner as in Example 1 with the only difference being that the proportions of resin a-1 (resins α-1 to α-6) and resin α-2 (resins β-1 to β-9), the ratios of tolylene diisocyanate added have been changed to the conditions in Table 3. The results of resin analysis and the properties of toner are shown in Table 3, together with those of Example 1. Incidentally, the resin 10 contained no resin a-1 and therefore no tolylene diisocyanate was added thereinto; and the resin 11 contained no resin a-2.

30 parts by weight of resin α-1, 70 parts by weight of resin β-1, and 16.1 mole % of tolylene diisocyanate, based on the total moles of the polyhydric alcohol-derived structure unit in the resin α-1, were kneaded and reacted in a twin screw extruder at 180° C. to obtain resin 1. The resin had a Tg of 58.4C, a Mw/Mn of 17.7 as measured by GPC, and a peak molecular weight of 6,000. The resin also had a THF insoluble component of 9% by weight.

100 parts by weight of a resin 1, 6 parts by weight of a carbon black (MA-100, a product of Mitsubishi Chemical Corporation) and 1.5 parts by weight of a charge control agent (BONTRON E-84, a product of Orient Chemical Instruments Inc.) and 2.0 parts by weight of a polypropylene wax (Hi-wax NP105; a product of Mitsui Chemicals, Inc.) were dispersed and mixed using a Henschel mixer; the resulting material was melt-kneaded at 120° C. using a twin screw extruder PCM-30 (a product of Ikegai Corporation) to obtain a toner composition in the bulk state. The resin after melt-kneading was coarsely ground using a hammer mill. The coarsely ground resin was finely ground using a jet grinder (IDS 2, a product of Nippon Pneumatic Co., Ltd.), followed by air classification, to obtain a toner fine powder having an average particle diameter of 10 micro-meters (5 micro-meters or less: 3% by weight, 20 micro-meters or more: 2% by weight). 100 parts by weight of the toner, 0.5 parts by weight of a hydrophobic silica (Aerosil R972, a product of Nippon Aerosil Co., Ltd.) was mixed using a Henschel mixer, feeding from the exterior to obtain toner particles. The toner particles were measured for offset resistance and development durability.

Examples 8 to 15

Example 8 is described below. Examples 9 to 15 are conducted in the same manner as example 8 except for the conditions described in Table 4. The analytic results are also shown in Table 4. 30 parts by weight of resin α-7, 70 parts by weight of resin β-10, 3.0 parts by weight of a polypropylene wax (Hi-wax NP105; a product of Mitsui Chemicals, Inc.) as wax having a low-molecular weight, 2.1 parts by weight (8.7 mol % based on the total moles of all the polyhydric alcohol-derived structure units in resin α-7) of tolylene diisocyanate were melt-kneaded to obtain resin 13. The resin had a Tg of 58.1° C., a Mw (weight-average molecular weight)/Mn (number-average molecular weight) of 21.4 as measured by GPC, and a peak molecular weight of 6,000. The resin also had a THF insoluble component of 7% by weight. 100 parts by weight of a resin 7, 6 parts by weight of a carbon black (MA-100, a product of Mitsubishi Chemical Corporation) and 1.5 parts by weight of a charge control agent (BONTRON E-84, a product of Orient Chemical Instruments Inc.) were dispersed and mixed using a Henschel mixer the resulting material was melt-kneaded at 120° C. using a twin screw extruder PCM-30 (a product of Ikegai Corporation) to obtain a toner composition in the bulk state. The toner composition was coarsely ground using a hammer mill. The coarsely ground resin was finely ground using a jet grinder (IDS 2, a product of Nippon Pneumatic Co., Ltd.), followed by air classification, to obtain a toner fine powder having an average particle diameter of 10 micro-meters (5 micro-meters or less: 3% by weight, 20 or more: 2% by weight). 100 parts by weight of the toner, 0.5 parts by weight of a hydrophobic silica (Aerosil R-972, a product of Nippon Aerosil Co., Ltd.) was mixed using a Henschel mixer, feeding from the exterior to obtain toner particles. The toner particles were measured for offset resistance, development durability and durability of fixing roller. Methods of analysis of fixing roller are as follows:

4. Durability of a Fixing Roller

The durability of a toner was evaluated by conducting continuous copying of 100,000 copies in a commercial copier (a product of Toshiba Corporation, named Presio 5560), and then visually examining the surface of the fixing roller, and evaluating the deterioration or scrape on the surface of fixing films after printing out.

○: Good
Δ: Not bad
x: Bad

A binder resin for a toner and a toner of the present invention comprises as described above; therefore, the resulting toner is superior in the fixing properties, offset resistance and development durability.

Thus the toner obtained according to the present invention can correspond to the recently increasing needs of copies and printers with a high speed and low-temperature fixing property.

TABLE 1

Production Example of Polyester Resin

| Resin | α-1 | α-2 | α-3 | α-4 | α-5 | α-6 | α-7 | α-8 |
|---|---|---|---|---|---|---|---|---|
| PET (mole %) | 50 | — | — | — | 25 | 59 | 50 | 26 |
| PBT (mole %) | — | — | — | 50 | 25 | — | — | 26 |
| KB300 (mole %) | 22 | 28 | 77 | 22 | 22 | 26 | 22 | 23 |
| Diethylene glycol (mole %) | — | 64 | 11 | — | — | — | — | — |
| Triethylene glycol (mole %) | 20 | — | — | 20 | 20 | 4 | 21 | 18 |
| Trimethylol-propane (mole %) | 8 | 8 | 12 | 8 | 8 | 11 | 7 | 7 |
| Terephthalic acid (mole %) | 36 | — | — | 36 | 36 | 29 | 36 | 37 |
| Isophthalic acid (mole %) | — | 84 | 86 | — | — | — | — | — |
| Benzoic acid (mole %) | — | — | 20 | — | — | 20 | — | — |
| Hydroxyl value (mgKOH/g) | 50 | 52 | 20 | 49 | 49 | 18 | 50 | 49 |

TABLE 2

Production Example of Polyester Resin

| Resin | β-1 | β-2 | β-3 | β-4 | β-5 | β-6 | β-7 | β-8 | β-9 | β-10 | β-11 |
|---|---|---|---|---|---|---|---|---|---|---|---|
| PET (mole %) | 67 | 67 | — | — | 34 | 30 | 70 | 68 | 69 | 68 | 34 |
| PBT (mole %) | — | — | — | 67 | 33 | — | — | — | — | — | 33 |
| KB300 (mole %) | 28 | 18 | 94 | 28 | 28 | 70 | 30 | 28 | 26 | 30 | 28 |
| Diethylene glycol (mole %) | — | — | — | — | — | — | — | — | — | — | — |
| Triethylene glycol (mole %) | — | — | — | — | — | — | — | — | — | — | — |
| Trimethylol-propane (mole %) | 5 | 15 | 6 | 5 | 5 | — | — | 4 | 5 | 2 | 5 |
| Terephthalic acid (mole %) | 33 | 31 | — | 33 | 33 | 68 | 35 | 37 | 37 | 34 | 33 |
| Isophthalic acid (mole %) | — | — | 103 | — | — | — | — | — | — | — | — |
| Benzoic acid (mole %) | 20 | 25 | 18 | 20 | 20 | 18 | 18 | 13 | — | 20 | 20 |
| Hydroxyl value (mgKOH/g) | <5 | <5 | <5 | <5 | <5 | <5 | <5 | <5 | <5 | <5 | <5 |

TABLE 3

Properties of Resin Composition for Toner and Evaluation Results of Toner

| Example/Comparative Example No. | Example 1 | Example 2 | Example 3 | Example 4 | Example 5 | Example 6 | Example 7 | Comparative Example 1 | Comparative Example 2 | Comparative Example 3 | Comparative Example 4 | Comparative Example 5 |
|---|---|---|---|---|---|---|---|---|---|---|---|---|
| Resin | Resin 1 | Resin 2 | Resin 3 | Resin 4 | Resin 5 | Resin 6 | Resin 11 | Resin 7 | Resin 8 | Resin 9 | Resin 10 | Resin 12 |
| Resin a-1 | | | | | | | | | | | | |
| Type | α-1 | α-1 | α-1 | α-4 | α-5 | α-1 | α-6 | α-2 | α-3 | α-1 | — | α-1 |
| (weight %) | 30 | 40 | 35 | 25 | 30 | 30 | 100 | 30 | 60 | 30 | — | 30 |
| Resin a-2 | | | | | | | | | | | | |
| Type | β-1 | β-2 | β-8 | β-4 | β-5 | β-9 | — | β-3 | β3 | β-6 | β-1 | β-7 |
| (weight %) | 70 | 60 | 65 | 75 | 70 | 70 | — | 70 | 40 | 70 | 100 | 70 |
| Tolylene diisocyanate (mole %) | 16.1 | 15.5 | 13.4 | 19.2 | 17.3 | 14.6 | 3.8 | 15.3 | 9.5 | 16.8 | — | 17.7 |
| Tg (° C.) | 58.4 | 63.2 | 62.1 | 57.1 | 57.6 | 59.4 | 58.2 | 55.2 | 61.3 | 58.9 | 56.1 | 58.6 |
| GPC | | | | | | | | | | | | |
| Mw/Mn | 17.7 | 23.4 | 18.1 | 16.3 | 20.5 | 15.4 | 35.6 | 9.5 | 20.6 | 21.3 | 5.3 | 13.1 |
| Peak molecular weight | 6000 | 6500 | 8000 | 6000 | 6500 | 19000 | 10000 | 5500 | 7000 | 6000 | 5000 | 6000 |

TABLE 3-continued

Properties of Resin Composition for Toner and Evaluation Results of Toner

| Example/Comparative Example No. Resin | Example 1 Resin 1 | Example 2 Resin 2 | Example 3 Resin 3 | Example 4 Resin 4 | Example 5 Resin 5 | Example 6 Resin 6 | Example 7 Resin 11 | Comparative Example 1 Resin 7 | Comparative Example 2 Resin 8 | Comparative Example 3 Resin 9 | Comparative Example 4 Resin 10 | Comparative Example 5 Resin 12 |
|---|---|---|---|---|---|---|---|---|---|---|---|---|
| THF insoluble portion (% by weight) | 9 | 12 | 10 | 6 | 7 | 8 | 4 | 7 | 12 | 10 | 0 | 11 |
| THF insol. | | | | | | | | | | | | |
| II-1-1 (mole %) | 70 | 70 | 70 | 70 | 70 | 70 | 63 | 64 | 11 | 70 | 0 | 70 |
| II-1-2 (mole %) | 8 | 8 | 8 | 8 | 8 | 5 | 11 | 8 | 12 | 8 | 0 | 8 |
| II-2 (mole %) | 22 | 22 | 22 | 22 | 22 | 22 | 26 | 28 | 77 | 22 | 0 | 22 |
| III (mole %) | 14 | 15 | 12 | 17 | 16 | 13 | 3 | 14 | 9 | 15 | 0 | 16 |
| THF sol. | | | | | | | | | | | | |
| IV-1 (mole %) | 67 | 68 | 69 | 68 | 68 | 69 | 63 | 14 | 5 | 37 | 67 | 70 |
| IV-2 (mole %) | 27 | 19 | 26 | 27 | 26 | 25 | 26 | 79 | 86 | 61 | 28 | 29 |
| V (mole %) | 6 | 13 | 5 | 5 | 6 | 6 | 11 | 7 | 9 | 2 | 5 | 1 |
| VI (mole %) | 3 | 3 | 3 | 3 | 4 | 3 | 2 | 3 | 4 | 3 | 0 | 3 |
| G' maximum value or shoulder | No | No | No | No | No | No | No | No | No | No | No | Yes |
| Fixing properties | ○ | ○ | ○ | ○ | ○ | Δ | Δ | ○ | X | Δ | X | X |
| Offset resistance | ○ | ○ | ○ | ○ | ○ | ○ | Δ | ○ | Δ | ○ | X | ○ |
| Development durability | ○ | ○ | ○ | ○ | ○ | ○ | ○ | X | Δ | X | X | ○ |

TABLE 4

Production and Evaluation of Toner

| Example No. Resin | Example 8 Resin 13 | Example 9 Resin 14 | Example 10 Resin 15 | Example 11 Resin 16 | Example 12 Resin 17 | Example 13 Resin 18 | Example 14 Resin 19 | Example 15 Resin 20 |
|---|---|---|---|---|---|---|---|---|
| Resin A | | | | | | | | |
| Type | α-7 | α-7 | α-7 | α-7 | α-7 | α-7 | α-7 | α-8 |
| (weight %) | 30 | 30 | 30 | 30 | 30 | 30 | 30 | 40 |
| Resin B | | | | | | | | |
| Type | β-10 | β-10 | β-10 | β-10 | β-10 | β-10 | β-10 | β-11 |
| (weight %) | 70 | 70 | 70 | 70 | 70 | 70 | 70 | 60 |
| Tolylene diisocyanate (weight %) | 2.1 | 2.1 | 2.1 | 2.1 | 2.1 | 2.1 | 2.1 | 2 |
| Tolylene diisocyanate (mole %) | 8.7 | 8.7 | 8.7 | 8.7 | 8.7 | 8.7 | 8.7 | 6.5 |
| Tg (° C.) | 58.1 | 58.9 | 58.8 | 59.2 | 54.8 | 56 | 57.2 | 58.1 |
| GPC | | | | | | | | |
| Mw/Mn | 21.4 | 19.5 | 20.3 | 18.7 | 19.6 | 22.3 | 21.5 | 25.4 |
| Peak molecular weight | 6000 | 6000 | 6000 | 6000 | 6000 | 6000 | 6000 | 7000 |
| THF insoluble portion (weight %) | 7 | 6 | 7 | 6 | 7 | 7 | 7 | 2 |
| THF insol. | | | | | | | | |
| II-1-1 (mole %) | 71 | 71 | 71 | 71 | 71 | 71 | 71 | 70 |
| II-1-2 (mole %) | 7 | 7 | 7 | 7 | 7 | 7 | 7 | 7 |
| II-2 (mole %) | 22 | 22 | 22 | 22 | 22 | 22 | 22 | 23 |
| III (mole %) | 8 | 8 | 8 | 8 | 8 | 8 | 8 | 6 |
| THF sol. | | | | | | | | |
| IV-1 (mole %) | 69 | 69 | 69 | 69 | 69 | 69 | 69 | 68 |
| IV-2 (mole %) | 28 | 28 | 28 | 28 | 28 | 28 | 28 | 26 |
| V (mole %) | 3 | 3 | 3 | 3 | 3 | 3 | 3 | 6 |
| VI (mole %) | 2 | 2 | 2 | 2 | 2 | 2 | 2 | 2 |
| In urethane reaction | | | | | | | | |
| Wax 1 | | | | | | | | |
| Type | PP | PP | PP | PP | Carnauba | Carnauba | PP | PP |
| Amount (weight %) | 3 | 3 | 5 | 1 | 5 | 7 | 3 | 3 |
| Wax 2 | | | | | | | | |
| Type | PP | — | — | — | — | — | Carnauba | — |
| Amount (weight %) | 2 | — | — | — | — | — | 3 | — |
| In kneading toner | | | | | | | | |
| Type of Wax | — | — | — | — | Carnauba | Carnauba | — | — |
| Amount | — | — | — | — | 2 | — | — | — |
| Fixing properties | ○ | ○ | ○ | ○ | ○ | ○ | ○ | ○ |

TABLE 4-continued

Production and Evaluation of Toner

| Example No.<br>Resin | Example 8<br>Resin 13 | Example 9<br>Resin 14 | Example 10<br>Resin 15 | Example 11<br>Resin 16 | Example 12<br>Resin 17 | Example 13<br>Resin 18 | Example 14<br>Resin 19 | Example 15<br>Resin 20 |
|---|---|---|---|---|---|---|---|---|
| Offset resistance | ◯ | ◯ | ◯ | Δ | ◯ | ◯ | ◯ | Δ |
| Development durability | ◯ | ◯ | Δ | ◯ | Δ | Δ | Δ | Δ |
| Durability of fixing roller | ◯ | ◯ | ◯ | ◯ | ◯ | ◯ | ◯ | Δ |

What is claimed is:

1. A binder resin for a toner comprising a polyester resin, wherein
the polyester resin comprises 0.1 to 40% by weight of tetrahydrofuran insoluble component (A-1) and 99.9 to 60% by weight of tetrahydrofuran soluble component (A-2);
the tetrahydrofuran insoluble component (A-1) has a polyester structure unit comprising;
a terephthalic acid-derived structure unit (I),
a polyhydric alcohol-derived structure unit (II) comprising 39.9 to 75 mole % of a dihydric alcohol-derived structure unit (II-1-1) having 2 to 10 carbon atoms,
0.1 to 20 mole % of a trihydric alcohol-derived structure unit (II-1-2) having 3 to 10 carbon atoms and
15 to 60 mole % of a dihydric alcohol-derived structure unit containing bisphenol skeleton (II-2),
each mole % being based on 100 mole % of the total moles of all the polyhydric alcohol-derived structure unit in component (A-1), and
0.1 to 30 mole % of di- or higher functional atomic group structure unit (III) of 1 to 20 carbon atoms having one or more kinds of elements selected from C, H, N, O and S, based on 100 mole % of the total moles of all the polyhydric alcohol-derived structure unit in component (A-1); and
the tetrahydrofuran soluble component (A-2) has a polyester structure unit comprising;
a terephthalic acid-derived structure unit (I),
a polyhydric alcohol-derived structure unit (IV) comprising
40 to 85 mole % of a dihydric alcohol-derived structure unit (IV-1) having 2 to 10 carbon atoms and
15 to 60 mole % of a dihydric alcohol-derived structure unit containing bisphenol skeleton (IV-2),
each mole % being based on 100 mole % of the total moles of all the polyhydric alcohol-derived structure unit in component (A-2),
2 to 20 mole % of tri- or higher functional atomic group structure unit (V) of 1 to 20 carbon atoms having one or more kinds of elements selected from C, H and O, based on 100 mole % of the total moles of all the polyhydric alcohol-derived structure unit in component (A-2), and
0 to 10 mole % of di- or higher functional atomic group structure unit (VI) having 1 to 20 carbon atoms based on 100 mole % of the total moles of all the polyhydric alcohol-derived structure unit in component (A-2).

2. A binder resin for a toner according to claim 1, wherein
(II-1-1) and (IV-1) structure units of the polyester resin (A) are an ethylene glycol-derived structure unit,
(II-1-2) and (V) structure units of the polyester resin (A) are a trimethylolpropane-derived structure unit,
(II-2) and (IV-2) structure units of the polyester resin (A) are a dihydric alcohol-derived structure unit containing bisphenol A skeleton, and
(III) and (VI) structure units of the polyester resin (A) are a di- or higher isocyanate-derived structure unit.

3. A binder resin for a toner comprising a polyester resin (A) obtained by reacting a polyester resin (a-1) with a polyester resin (a-2) and di- or higher functional isocyanate (iii), wherein the polyester resin (a-1) comprises;
a terephthalic acid-derived structure unit (I),
a polyhydric alcohol-derived structure unit (II) comprising
39.9 to 75 mole % of a dihydric alcohol-derived structure unit (II-1-1) having 2 to 10 carbon atoms,
0.1 to 20 mole % of a trihydric alcohol-derived structure unit (II-1-2) having 3 to 10 carbon atoms and
15 to 60 mole % of a dihydric alcohol-derived structure unit containing bisphenol skeleton (II-2),
each mole % being based on 100 mole % of the total moles of all the polyhydnc alcohol-derived structure unit in polyester resin (a-1);
the polyester resin (a-2) comprises;
a terephthalic acid-derived structure unit (I),
a polyhydric alcohol-derived structure unit (IV) comprising
40 to 85 mole % of a dihydric alcohol-derived structure unit (IV-1) having 2 to 10 carbon atoms and
15 to 60 mole % of a dihydric alcohol-derived structure unit containing bisphenol skeleton (IV-2),
each mole % being based on 100 mole % of the total moles of all the polyhydric alcohol-derived structure unit in polyester resin (a-2), and
2 to 20 mole % of tri- or higher functional atomic group structure unit (V) of 1 to 20 carbon atoms having one or more kinds of elements selected from C, H and O, based on 100 mole % of the total moles of all the polyhydnc alcohol-derived structure unit in polyester resin (a-2).

4. A process for producing a binder resin for a toner comprising the steps of:
producing a polyester resin (a-1) depolymerization and polycondensation of
a terephthalic acid derivative (i),
a polyhydric alcohol (ii) comprising
a dihydric alcohol (ii-1-1) having 2 to 10 carbon atoms,
a trihydric alcohol (ii-1-2) having 3 to 10 carbon atoms and
a bisphenol or a derivative thereof (ii-2), and
a terephthalic acid polyester resin (vii);
producing a polyester resin (a-2) of depolymerization and polycondensation
the terephthalic acid derivative (i), a polyhydric alcohol (iv) comprising a dihydric alcohol (iv-1) having 2 to 10 carbon atoms, a bisphenol type derivative (iv-2) and a tri- or higher alcohol (iv-3) having 1 to 20 carbon atoms, and the terephthalic acid polyester resin (vii); and reacting the polyester resin (a-1), the polyester resin (a-2) and a di- or higher functional isocyanate (iii).

5. A binder resin for a toner wherein the binder resin is obtained by reacting a polyester resin (a-1) with a bi- or higher functional isocyanate (iii) in the presence of a low-molecular weight wax (vii).

6. The binder resin for a toner according to claim 5, wherein the binder resin is obtained by reacting the polyester resin (a-1) further with a polyester resin (a-2).

7. A toner comprising a binder resin for a toner according to claim 1.

8. A toner comprising a binder resin for a toner according to claim 3.

9. A toner comprising a binder resin for a toner according to claim 5.

10. A toner comprising a binder resin fore a toner according to claim 6.

* * * * *